US011200137B1

(12) United States Patent
Serita et al.

(10) Patent No.: US 11,200,137 B1
(45) Date of Patent: Dec. 14, 2021

(54) SYSTEM AND METHODS FOR FAILURE OCCURRENCE PREDICTION AND FAILURE DURATION ESTIMATION

(71) Applicant: Hitachi, Ltd., Tokyo (JP)

(72) Inventors: Susumu Serita, San Jose, CA (US);
Chi Zhang, San Jose, CA (US);
Chetan Gupta, San Mateo, CA (US);
Qiyao Wang, Los Gatos, CA (US);
Huijuan Shao, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/998,926

(22) Filed: Aug. 20, 2020

(51) Int. Cl.
*G06F 11/00* (2006.01)
*G06F 11/30* (2006.01)
*G06F 11/07* (2006.01)
*G06F 11/34* (2006.01)

(52) U.S. Cl.
CPC ........ *G06F 11/3089* (2013.01); *G06F 11/076* (2013.01); *G06F 11/0709* (2013.01); *G06F 11/0757* (2013.01); *G06F 11/3447* (2013.01)

(58) Field of Classification Search
CPC ............. G06F 11/3089; G06F 11/0709; G06F 11/0757; G06F 11/076; G06F 11/3447
See application file for complete search history.

(56) References Cited

U.S. PATENT DOCUMENTS

| 10,613,962 | B1* | 4/2020 | Delange .............. G06F 11/3006 |
| 2008/0250265 | A1* | 10/2008 | Chang ................. G06F 11/0709 714/4.12 |
| 2014/0111218 | A1 | 4/2014 | Krishnamoorthy et al. |
| 2018/0294174 | A1* | 10/2018 | Fujikata ............... G05B 19/058 |
| 2019/0196430 | A1* | 6/2019 | Seo ......................... G06Q 10/04 |
| 2020/0057689 | A1* | 2/2020 | Farahat ............... G06F 11/3447 |

* cited by examiner

*Primary Examiner* — Charles Ehne (74) *Attorney, Agent, or Firm* — Procopio, Cory, Hargreaves & Savitch LLP (57) ABSTRACT

Aspects of the present disclosure are directed to systems and methods for determining execution of failure prediction models and duration prediction models for a sensor system. Systems and methods can involve receiving streaming data from one or more sensors and for a failure prediction model processing the streaming data indicating a predicted failure with a probability higher than a threshold, obtaining a duration of the predicted failure from a duration prediction model configured to predict durations of detected failures based on the streaming data; deactivating the failure prediction model when the predicted failure occurs; and determining a time to reactivate the failure prediction model based on the obtained duration of the predicted failure.

20 Claims, 10 Drawing Sheets

SYSTEM AND METHODS FOR FAILURE OCCURRENCE PREDICTION AND FAILURE DURATION ESTIMATION

BACKGROUND

Field

The present disclosure is generally directed to failure prediction, and more specifically, to systems and methods for failure occurrence prediction and failure duration estimation.

Related Art

Unexpected failures can cause trouble to factory operations. Failures are classified as equipment failure and/or process failure. Equipment failures are events that render equipment to be temporary unusable. Machine breakdown due to overrunning is one example of equipment failure. An operation stops until a machine becomes available through diagnosis and repair action. Process failures are events that cause performance decrease such as operation delay or low-quality product. Overloading in water plant is one example of process failure. Process failure differs from equipment failure in several points. One major difference is that process failure is not an instant event, but it lasts for some duration and typically operation does not stop during the failure.

Several related art methods are known to predict the occurrence of equipment failures using sensor measurements. The related art methods extract statistical features from sensor measurements and build a mathematical model that predicts if a failure occurs in a next predefined period (e.g., one hour). However, predicting the occurrence of failure is not enough for factory operators to address a potential failure. Factory operators need to change their operations once a process failure happens.

For example, the amount of material released to the factory needs to be adjusted based on the impact of failure, or additional operators needs to be assigned for recovering the production system. To execute these changes efficiently and effectively, more detailed information is required in addition to a failure occurrence. Another challenge is successive failures can occur after a failure with only a short or no intervening interval, that requires prediction even during the preceding failure. In a typical equipment failure prediction scenario, the prediction resumes once the failed equipment returns to operation when an actual failure occurs. In such a case, the sensor measurements exhibit the normal behavior and are ready to apply a prediction model for the next failure. However, prediction during a failure period, which is required for process failure cases, has some difficulty in execution. If the prediction restarts in the early stage of a failure, the false positive rate increases as the sensor measurements are likely to exhibit similar behavior with the previous failure. Therefore, judging a right timing to restart the failure prediction is important.

SUMMARY

To address the issues with the related art, example implementations involve two prediction models: 1) predicting an occurrence of a process failure, and 2) predicting duration of a process failure. The first model detects failure symptoms from the sensor measurements and outputs the probability that a failure will happen within predefined time span. The second model predicts how long a potential failure will continue if a failure happens. The second model utilizes the prediction result of the first model to output the estimated duration until the system observes actual failure occurrence. Once the system observes a failure, the second model keeps updating the expected end time of the failure based on the current status captured from sensor measurements. The first model restarts the prediction for a potential successive failure based on the expected end time given by the second model.

Through the example implementations described herein, it is possible to provide information to factory operators about process failures through using sensor measurements collected in real time fashion.

Aspects of the present disclosure can involve a method, which can include receiving streaming data from one or more sensors. For a failure prediction model processing the streaming data indicating a predicted failure with a probability higher than a threshold, the method can further involve obtaining a duration of the predicted failure from a duration prediction model configured to predict durations of detected failures based on the streaming data; deactivating the failure prediction model when the predicted failure occurs; and determining a time to reactivate the failure prediction model based on the obtained duration of the predicted failure.

Aspects of the present disclosure can involve a non-transitory computer readable medium, storing instructions for executing a process, the instructions which can include receiving streaming data from one or more sensors. For a failure prediction model processing the streaming data indicating a predicted failure with a probability higher than a threshold, the instructions can further involve obtaining a duration of the predicted failure from a duration prediction model configured to predict durations of detected failures based on the streaming data; deactivating the failure prediction model when the predicted failure occurs; and determining a time to reactivate the failure prediction model based on the obtained duration of the predicted failure.

Aspects of the present disclosure can involve a system, which can include means for receiving streaming data from one or more sensors. For a failure prediction model processing the streaming data indicating a predicted failure with a probability higher than a threshold, the system can further involve means for obtaining a duration of the predicted failure from a duration prediction model configured to predict durations of detected failures based on the streaming data; means for deactivating the failure prediction model when the predicted failure occurs; and means for determining a time to reactivate the failure prediction model based on the obtained duration of the predicted failure.

Aspects of the present disclosure can involve an apparatus, which can include a processor configured to receive streaming data from one or more sensors. For a failure prediction model processing the streaming data indicating a predicted failure with a probability higher than a threshold, the processor can further be configured to obtain a duration of the predicted failure from a duration prediction model configured to predict durations of detected failures based on the streaming data; deactivate the failure prediction model when the predicted failure occurs; and determine a time to reactivate the failure prediction model based on the obtained duration of the predicted failure.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 1:
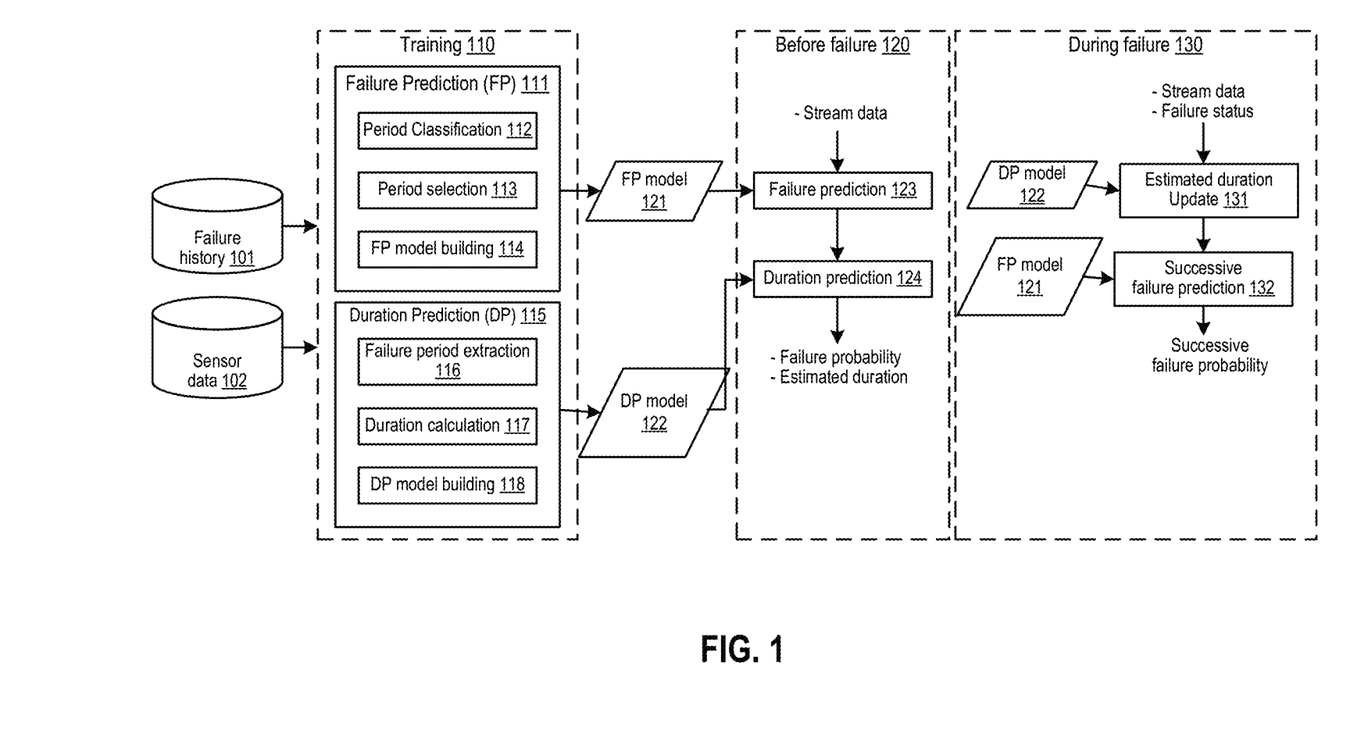
FIG. 1 illustrates an example system upon which example implementations may be applied.

FIG. 1 illustrates an example system upon which example implementations may be applied. In an example of the system, failure history 101 and sensor data 102 is integrated into a training process 110 to train algorithms for failure prediction (FP) 111 and duration prediction (DP) 115. FP 111 is configured to generate a FP model 121 through using sub-processes on the failure history 101 and the sensor data 102 including period classification 112, period selection 113, and FP model building 114. DP 115 is configured to generate a DP model 122 through using sub-processes on the failure history 101 and the sensor data 102 include failure period extraction 116 from the FP 111, duration calculation 117 and DP model building 118.

The FP model 121 and the DP model 122 are applied on streaming data received from sensors across various equipment. During the processing of the streaming data by the FP model 121 and the DP model 122, there are two time periods taken into consideration for a failure situation, the time period before failure 120, and during the failure 130. During the time period before failure 120, the stream data is processed by the FP model 121 to conduct failure prediction 123, and processed by the DP model 122 to conduct duration prediction 124 to generate the probability of failure and the expected duration of the potential failure.

When a failure has occurred, then the FP model 121 and the DP model 122 are used in tandem on the stream data and the failure status. The DP model 122 is initially applied on the stream data and the failure status to update the estimated duration of the failure 131. When the duration reaches a certain time before the end of the failure, the FP model 121 is re-engaged to predict any successive failures at 132 to produce a successive failure probability.

In example implementations described herein, there are two types of failures: process failures and equipment failure. Equipment failure involves a breakdown of the underlying machine or apparatus in the manufacturing system that causes a halt or stoppage of the manufacturing process operations. Process failures involve anomalies that occur in the manufacturing system but that do not otherwise cause a halt or stoppage of the manufacturing process operations. During process failures, there is a defined starting point and ending point; thus process failures have a definable duration depending on the underlying problem. Example of process failures can involve an overload in a water plant or a similar process.

During a process failure, there are systems that are configured to detect equipment failure through use of failure prediction models based on the sensor measurement. However, there are situations in which the production schedule may need to change based on the duration of the process failure, and having models that predict the failure occurrence may be insufficient. In an example, suppose in a process failure, a subsequent failure happens after the current failure without any meaningful intervening periods of time. In such situations, the next failure may need to be predicted even during the current failure. Thus, process failures are different from equipment failures in that during equipment failures, the operation is halted and restarted so there is no need to conduct failure prediction during breakdowns.

Thus, example implementations described herein are directed to constructing a prediction model for process failures that can predict the remaining duration of the failure when the failure occurs.

Figure 2:
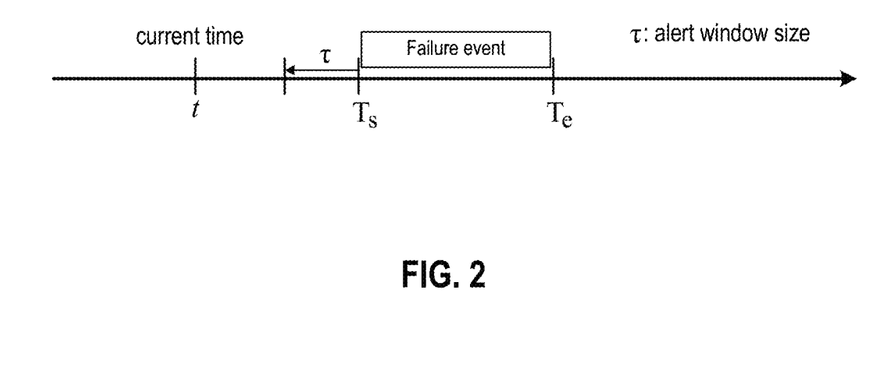
FIG. 2 illustrates an example problem setting, in accordance with an example implementation.

FIG. 2 illustrates an example problem setting, in accordance with an example implementation. In an example implementation for predicting a failure event, there are two types of models that are utilized: failure prediction models and duration prediction models. Failure prediction models are configured to predict when the failure happens, which is similar to equipment failure prediction. To conduct failure prediction, time/alert windows T are defined (e.g., one hour), and failure prediction is conducted for determining whether the failure happens within the next time window. Failure prediction models are configured to provide probabilities of failure over a probability distribution (e.g., a probability distribution given some certain status of a factory floor). For example, failure prediction is conducted as follows:

$$Pr(T_s - \tau < t | t < T_s) = \int_0^\tau f(z|x)dz$$

where $f(z|x)$ is the probability density that a failure occurs $z$ time later when current state is $x$.

The duration prediction models are configured to determine a starting time ($T_s$) and ending time ($T_e$) of the failure event. Once those times are determined the duration prediction predicts the duration of the failure event by taking the difference between Te and Ts. In an example implementation, the duration prediction model can be as follows:

$$\mathbb{E}[T_e - T_s \mid \text{failure occurs}] =$$
$$\begin{cases} \mathbb{E}[T_e - T_s \mid T_s - \tau < t < T_s] & \text{Before failure occurs} \\ \mathbb{E}[T_e - T_s \mid T_s < t < T_e] & \text{After failure occurs} \end{cases}$$

Thus, before the failure happens, there is a need to predict Te, Ts and the difference between Te and Ts. However, in situations in which the failure has already occurred, there is also a need to estimate when the failure ends. In such situations, there is a need to predict the time until the end of the failure event. After failure occurs, the equivalent to estimate time until the end of the failure is as follows:

$$\mathbb{E}[T_e - t \mid T_s < t < T_e] = \int_0^\infty z g(z \mid x) dz$$

wherein g(z|x): Probability density that a failure ends z time later when current state is x. In the example implementations described herein, there are systems and methods to determine f (z|x) and g(z|x).

Figure 3:
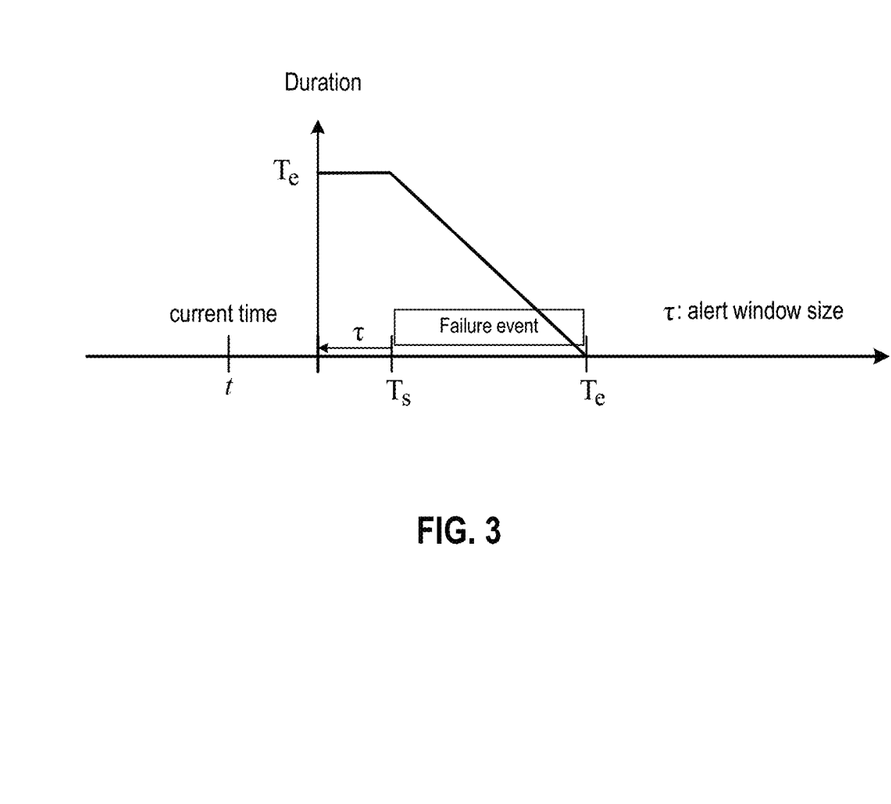
FIG. 3 illustrates an example training strategy for failure prediction and duration prediction, in accordance with an example implementation.

FIG. 3 illustrates an example training strategy for failure prediction and duration prediction, in accordance with an example implementation. Thus, there are two models f (z|x) and g(z|x) that are to be determined. In example implementations, the failure prediction model and the duration prediction model can be trained separately. Failure prediction model can be trained in accordance with any desired implementation as known to a person of ordinary skill in the art.

In example implementations, the scope of g(z|x) is extended to a point in time before the failure, so that the problem is equivalent to training a regression model with a true curve illustrated in FIG. 3.

Figure 4:
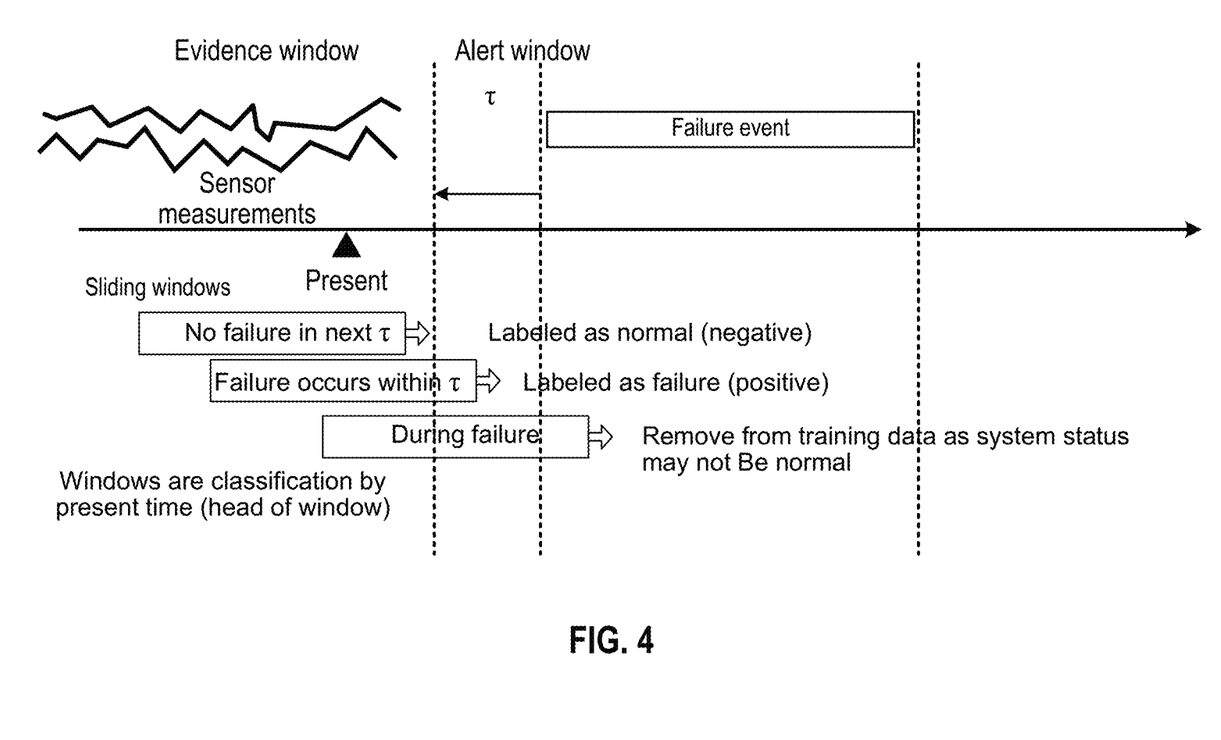
FIG. 4 illustrates an example of label assignment and data selection in training the failure prediction model, in accordance with an example implementation.

FIG. 4 illustrates an example of label assignment and data selection in training the failure prediction model, in accordance with an example implementation. Specifically, FIG. 4 illustrates an example of labeling historical data for training failure prediction while taking into account an alert window and a desired sliding window. In the example of FIG. 4, a label is assigned for each sliding window, which is referred to as an evidence window. The evidence window can be set at any length in accordance with the desired implementation. In the evidence window, sensor measurements are extracted. Such sensor measurements can be temperature, pressure, or other values in accordance with the desired implementation. From such measurements, example implementations conduct feature extraction and use the features to train the machine learning models for failure prediction.

For training the machine learning model, labels are utilized. In the example for failure prediction, labels can be set to positive (failure has occurred), or negative (failure has not occurred). Each window is assigned a label. In example implementations as illustrated in FIG. 4, as the failure prediction models are directed to predicting if failure has occurred, if the failure is not predicted to occur within a next time window, the negative label is applied. However, when the window is sliding within the alert window τ, then a positive label is assigned. When the sliding window overlaps the starting point of the failure, portions of the sensor data during normal operations overlap with portions of data during the failure. Thus, data during this time period should not be assigned a negative or a positive label as it involves a hybrid. Instead, the data is not used and removed from the training data as the status of the system may or may not be operating normally during this sliding window.

Figure 5:
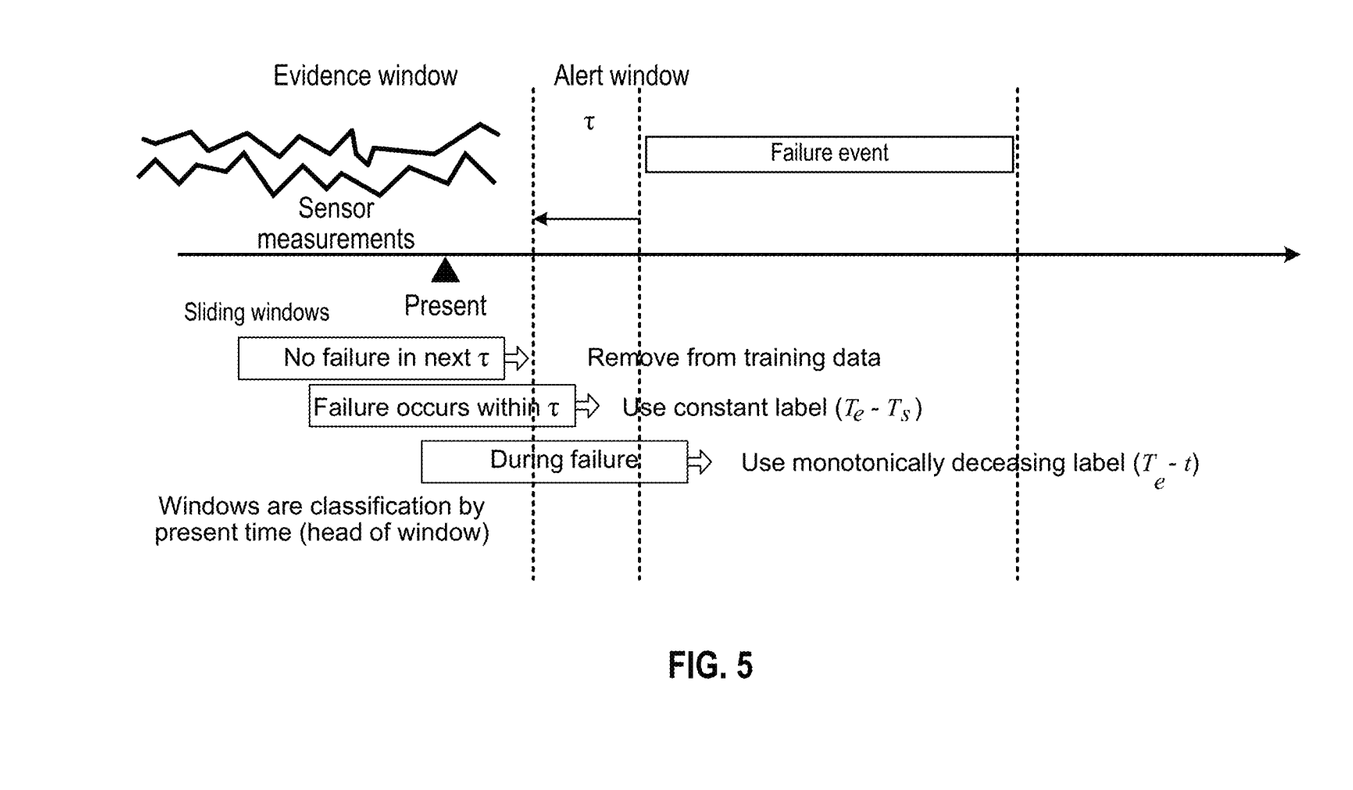
FIG. 5 illustrates an example of label assignment and data selection in training the duration prediction model, in accordance with an example implementation.

FIG. 5 illustrates an example of label assignment and data selection in training the duration prediction model, in accordance with an example implementation. Specifically, FIG. 5 illustrates an example of labeling historical data for training duration prediction while taking into account an alert window and a desired sliding window. In a similar manner to FIG. 4, labels are assigned to sliding windows for training the duration prediction models. Because duration prediction models are directed to predict the duration of a failure when a failure happens, during normal periods of operation there is no failure event that can be utilized to predict the failure duration, so such sliding windows are removed from the training data.

For sliding windows within the alert window τ, as a failure is predicted to occur within the sliding window, a constant label (Te-Ts) is utilized as the starting point (Ts) and ending point (Te) are known from the historical data. After the sliding window encompasses the starting point and is monitoring the situation during failure, the label is assigned with monotonically decreasing label (Te-t) wherein t represents the time at the end of the sliding window.

Through the example implementations of FIG. 4 and FIG. 5, features can be obtained for each sliding window and each label from the historical data to train a failure prediction model and a duration prediction model. Once the failure prediction model and the duration prediction models are obtained, the models can then be applied to an actual manufacturing system in which streaming data from the manufacturing system is provided to the models to conduct prediction. The application of models to the manufacturing system is termed as the application phase.

Figure 6:
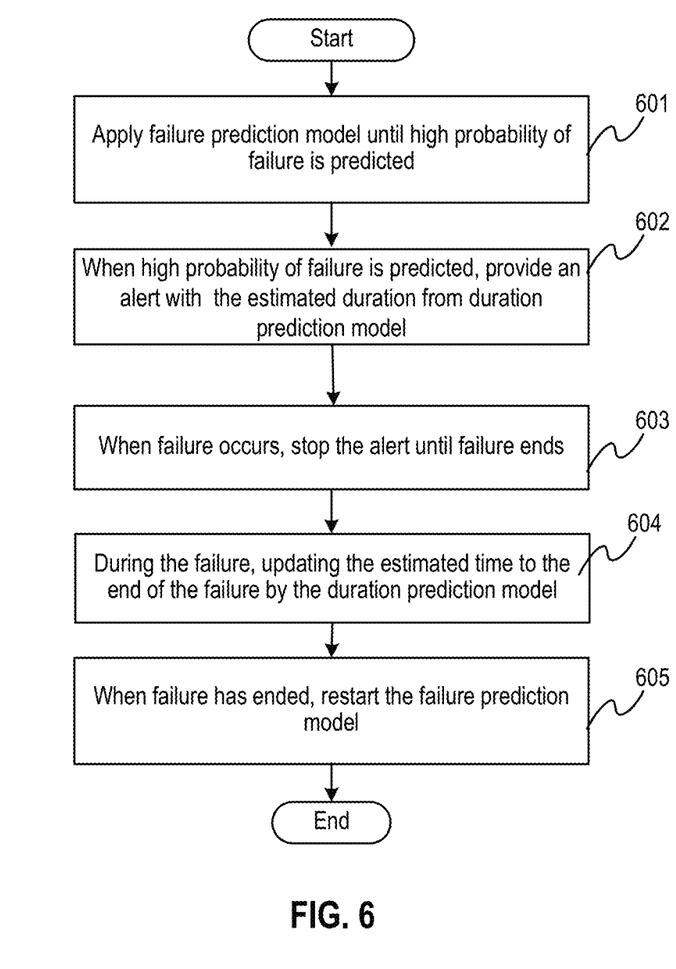
FIG. 6 illustrates an example flow diagram for the application phase, in accordance with an example implementation.

FIG. 6 illustrates an example flow diagram for the application phase, in accordance with an example implementation. At 601, the failure prediction model is applied on the streaming sensor data. In an example implementation, during each minute of the manufacturing system operation, streaming sensor data is obtained and feature extraction is conducted to apply the failure prediction model. At 602, once the failure prediction model predicts a high probability of failure (e.g., above a threshold) an alert is issued and the duration prediction model is utilized to determine how long the potential failure will continue. This is conducted before the actual failure has occurred.

At 603, when the actual failure has occurred and the failure prediction has been accurate, the failure prediction model can be halted as well as the alert as the failure has already occurred, so failure prediction is not needed at the moment. At 604, the estimated time is updated until the end of the failure from the duration prediction model. That is, the duration prediction model continues to operate as the estimate can change over time. At 605, once the failure has ended, then the failure prediction model is reactivated to predict the next failure.

Figure 7:
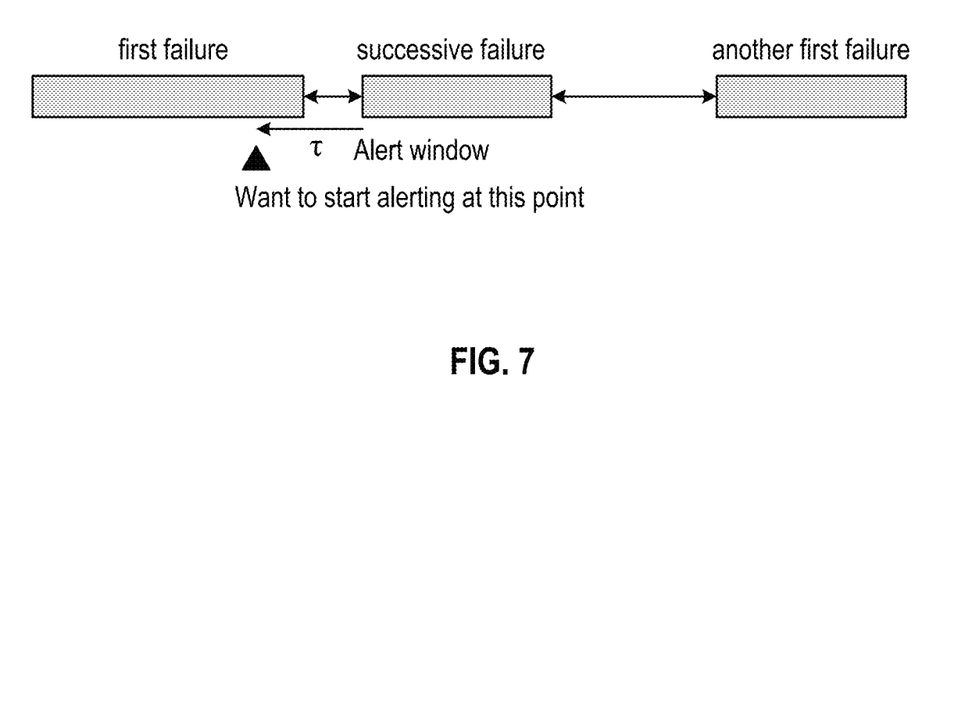
FIG. 7 illustrates an example of prediction for successive failures, in accordance with an example implementation.

In another example implementations, there can be a need to conduct prediction during the failure (e.g., to predict the next failure even during the current failure). FIG. 7 illustrates an example of prediction for successive failures, in accordance with an example implementation. In the example of FIG. 7, when it is possible for the failure interval to be shorter than the alert window size, there can be a need to provide an alert during the first failure to predict the second one. In such example implementations, there can be a need to restart the prediction of the failure prediction model before the alert window of the successive failure in order to predict the successive failure.

However, if the failure prediction model is invoked during the failure, then the sensor measurements and extracted features may instead predict the current failure instead of the subsequent failure. Thus, a timing needs to be determined for reactivating the failure prediction model.

Figure 8:
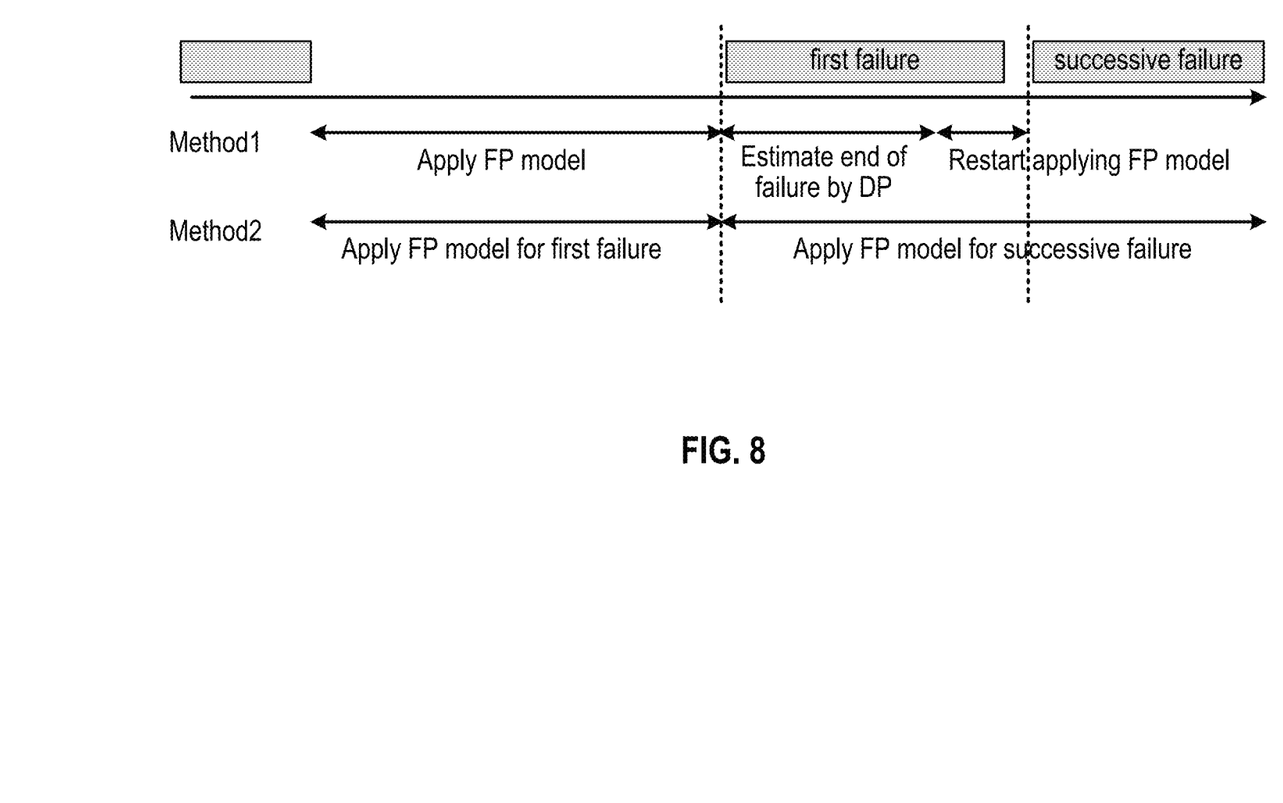
FIG. 8 illustrates two methods for predicting successive failures, in accordance with an example implementation.

FIG. 8 illustrates two methods for predicting successive failures, in accordance with an example implementation. Simply applying the failure prediction model after a failure can cause false alerts when the system state is close to the first failure. To address this issue, two example implementation methods are proposed.

In a first example method (Method1): the prediction is restarted based on the estimated remaining time to end of the failure. The assumption is that system state will return to normal at the point near the end of the initial failure, but will have the potential to cause a subsequent failure. In such an example implementation, the prediction can be restarted at some time such that the subsequent failure can be detected within alert window τ. In an example implementation, the start time can be the difference between the predicted end to the failure and the length of the alert window.

In a second example method (Method2), a model is built for successive failures separately from for the first failure. An alternative way to implement the second example method is to build one model, but add the indication of failure occurrence in the features. Depending on the desired implementation, Method1 and Method2 can be applied concurrently.

Thus, in example implementations involving the prediction of successive failures, the duration prediction model is utilized to determine when the failure is to end. Based on the predicted endpoint of the failure, the status of the system is presumed to be close to normal state and ready to predict the next failure. Depending on the desired implementation, the duration prediction model can be constantly invoked (e.g., output is discarded until the failure actually occurs), or can be invoked once the failure occurs, in accordance with the desired implementation.

Through the example implementations described herein, there can be provided a method and system to predict process failure occurrence and provide estimated duration of the potential failure.

Figure 9:
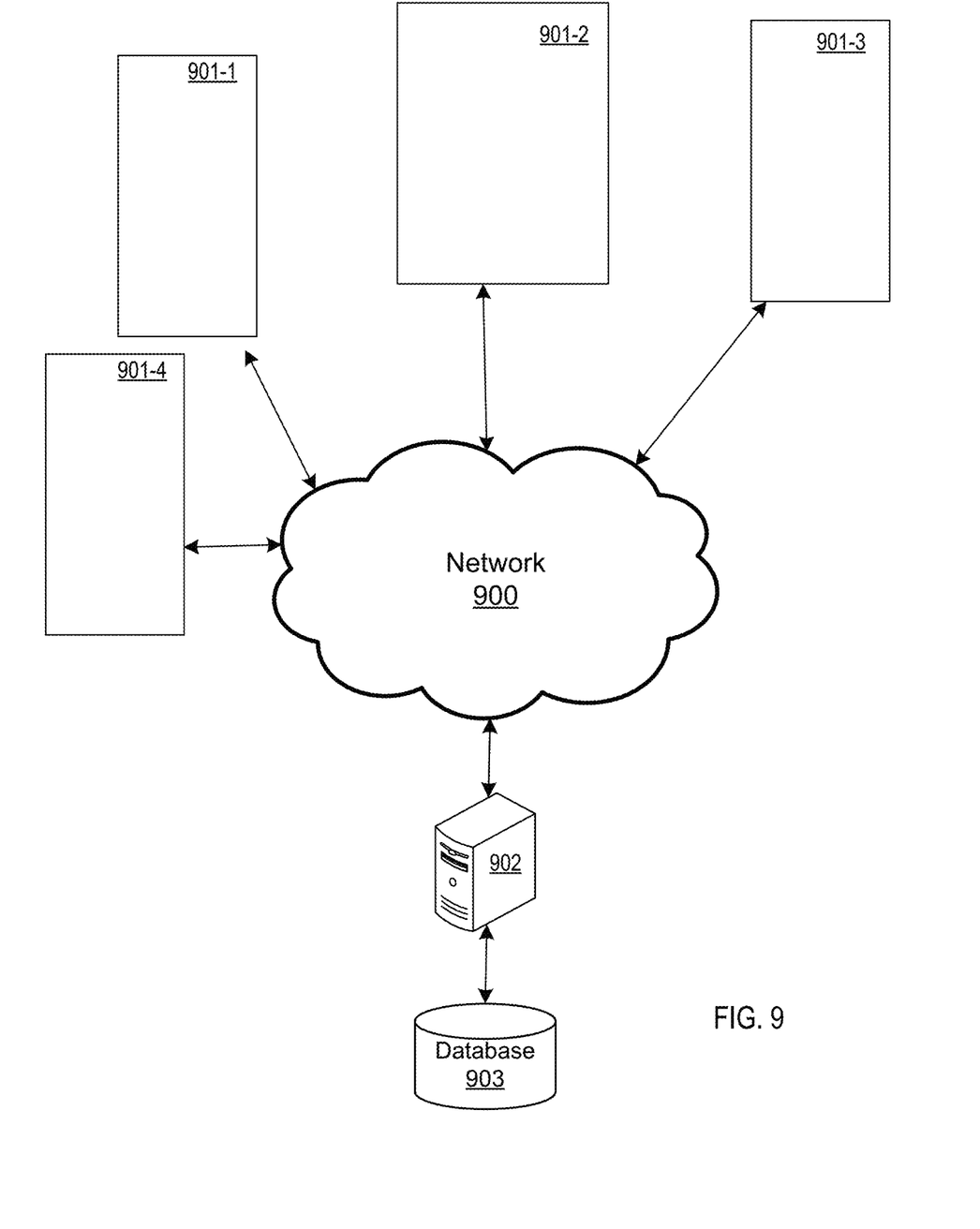
FIG. 9 illustrates a system involving a plurality of systems with connected sensors and a management apparatus, in accordance with an example implementation.

FIG. 9 illustrates a system involving a plurality of systems with connected sensors and a management apparatus, in accordance with an example implementation. One or more systems with connected sensors 901-1, 901-2, 901-3, and 901-4 are communicatively coupled to a network 900 which is connected to a management apparatus 902, which facilitates functionality for an Internet of Things (IoT) gateway or other manufacturing management system. The management apparatus 902 manages a database 903, which contains historical data collected from the sensors of the systems 901-1, 901-2, 901-3, and 901-4. In alternate example implementations, the data from the sensors of the systems 901-1, 901-2, 901-3, 90-4 and can be stored to a central repository or central database such as proprietary databases that intake data such as enterprise resource planning systems, and the management apparatus 902 can access or retrieve the data from the central repository or central database. Such systems can include robot arms with sensors, turbines with sensors, lathes with sensors, and so on in accordance with the desired implementation.

Figure 10:
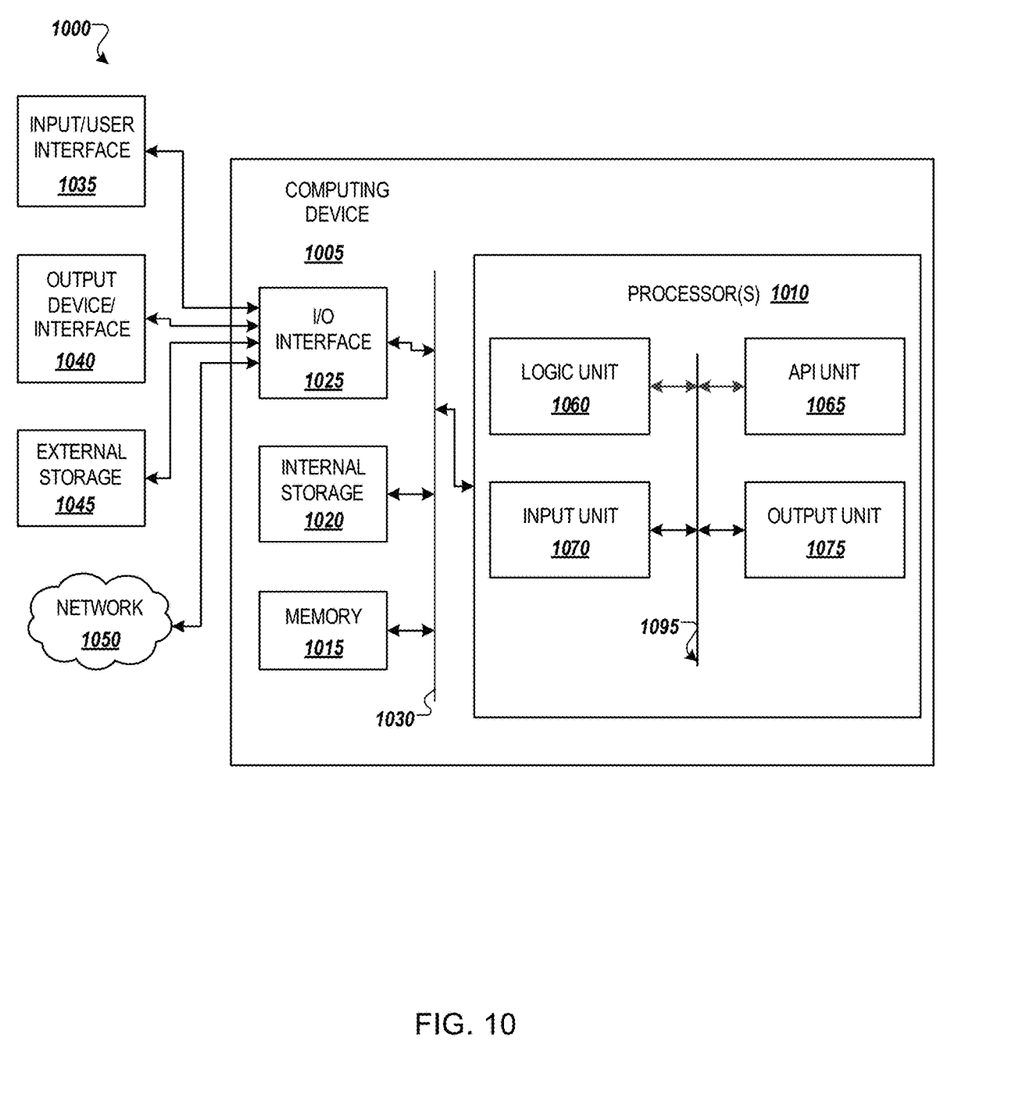
FIG. 10 illustrates an example computing environment with an example computer device suitable for use in some example implementations.

FIG. 10 illustrates an example computing environment with an example computer device suitable for use in some example implementations, such as a management apparatus 902 as illustrated in FIG. 9 configured to act as an IoT platform or manufacturing management system. Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or IO interface 1025, any of which can be coupled on a communication mechanism or bus 1030 for communicating information or embedded in the computer device 1005. IO interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via IO interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

TO interface 1025 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Processor(s) 1010 can be configured to receive streaming data from one or more sensors as illustrated in FIG. 1 and FIG. 9. For a failure prediction model processing the streaming data indicating a predicted failure with a probability higher than a threshold, processor(s) 1010 can be configured to obtain a duration of the predicted failure from a duration prediction model configured to predict durations of detected failures based on the streaming data; deactivate the failure prediction model when the predicted failure occurs; and determine a time to reactivate the failure prediction model based on the obtained duration of the predicted failure as illustrated in FIGS. 1 to 6.

Depending on the desired implementation, the duration prediction model can be executed on the streaming data continuously and the failure prediction model can be continuously executed on the streaming data, wherein processor(s) 1010 can be configured to deactivate the failure prediction model when the failure prediction occurs by discarding output from the failure prediction model until the failure prediction model is reactivated as illustrated in FIGS. 7 and 8.

As illustrated in FIGS. 6 and 7, processor(s) 1010 can be configured to determine the time to reactivate the failure prediction model by determining an end time of the predicted failure; and determining the time to reactivate the failure prediction model within an alert window time period before the end time of the predicted failure.

As illustrated in FIGS. 6 and 8, processor(s) 1010 can be configured to determine the time to reactivate the failure prediction model by executing a modified failure prediction model on the streaming data configured to detect a successive failure after the predicted failure; and determining the time to reactivate the failure prediction model as when the predicted failure ends.

As illustrated in FIGS. 6 and 8, processor(s) 1010 can be configured to reactivate the failure prediction model for processing the stream data at the determined time.

As illustrated in FIGS. 5, 6 and 9, the duration prediction model can be trained to predict durations based on start points and end points of historical failure data.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   receiving streaming data from one or more sensors;
   for a failure prediction model processing the streaming data indicating a predicted failure with a probability higher than a threshold:
      obtaining a duration of the predicted failure from a duration prediction model configured to predict durations of detected failures based on the streaming data;
      deactivating the failure prediction model when the predicted failure occurs; and
      determining a time to reactivate the failure prediction model based on the obtained duration of the predicted failure.

2. The method of claim 1, wherein the duration prediction model is executed on the streaming data continuously.

3. The method of claim 2, wherein the failure prediction model is continuously executed on the streaming data, wherein the deactivating the failure prediction model when the failure prediction occurs comprises discarding output from the failure prediction model until the failure prediction model is reactivated.

4. The method of claim 1, wherein the determining the time to reactivate the failure prediction model comprises:
   determining an end time of the predicted failure; and
   determining the time to reactivate the failure prediction model within an alert window time period before the end time of the predicted failure.

5. The method of claim 1, wherein the determining the time to reactivate the failure prediction model comprises:
   executing a modified failure prediction model on the streaming data configured to detect a successive failure after the predicted failure; and
   determining the time to reactivate the failure prediction model as when the predicted failure ends.

6. The method of claim 1, further comprising reactivating the failure prediction model for processing the stream data at the determined time.

7. The method of claim 1, wherein the duration prediction model is trained to predict durations based on start points and end points of historical failure data.

8. A non-transitory computer readable medium, storing instructions for executing a process, the instructions comprising:
   receiving streaming data from one or more sensors;
   for a failure prediction model processing the streaming data indicating a predicted failure with a probability higher than a threshold:
      obtaining a duration of the predicted failure from a duration prediction model configured to predict durations of detected failures based on the streaming data;
      deactivating the failure prediction model when the predicted failure occurs; and
      determining a time to reactivate the failure prediction model based on the obtained duration of the predicted failure.

9. The non-transitory computer readable medium of claim 8, wherein the duration prediction model is executed on the streaming data continuously.

10. The non-transitory computer readable medium of claim 9, wherein the failure prediction model is continuously executed on the streaming data, wherein the deactivating the failure prediction model when the failure prediction occurs comprises discarding output from the failure prediction model until the failure prediction model is reactivated.

11. The non-transitory computer readable medium of claim 8, wherein the determining the time to reactivate the failure prediction model comprises:
   determining an end time of the predicted failure; and
   determining the time to reactivate the failure prediction model within an alert window time period before the end time of the predicted failure.

12. The non-transitory computer readable medium of claim 8, wherein the determining the time to reactivate the failure prediction model comprises:
   executing a modified failure prediction model on the streaming data configured to detect a successive failure after the predicted failure; and
   determining the time to reactivate the failure prediction model as when the predicted failure ends.

13. The non-transitory computer readable medium of claim 8, further comprising reactivating the failure prediction model for processing the stream data at the determined time.

14. The non-transitory computer readable medium of claim 8, wherein the duration prediction model is trained to predict durations based on start points and end points of historical failure data.

15. An apparatus, comprising:
   a processor, configured to:
      receive streaming data from one or more sensors;
      for a failure prediction model processing the streaming data indicating a predicted failure with a probability higher than a threshold:
         obtain a duration of the predicted failure from a duration prediction model configured to predict durations of detected failures based on the streaming data;
         deactivate the failure prediction model when the predicted failure occurs; and
         determine a time to reactivate the failure prediction model based on the obtained duration of the predicted failure.

16. The apparatus of claim 15, wherein the duration prediction model is executed on the streaming data continuously.

17. The apparatus of claim 16, wherein the failure prediction model is continuously executed on the streaming data, wherein the processor is configured to deactivate the failure prediction model when the failure prediction occurs by discarding output from the failure prediction model until the failure prediction model is reactivated.

18. The apparatus of claim 15, wherein the processor is configured to determine the time to reactivate the failure prediction model by:
 determining an end time of the predicted failure; and
 determining the time to reactivate the failure prediction model within an alert window time period before the end time of the predicted failure.

19. The apparatus of claim 15, wherein the processor is configured to determine the time to reactivate the failure prediction model by:
 executing a modified failure prediction model on the streaming data configured to detect a successive failure after the predicted failure; and
 determining the time to reactivate the failure prediction model as when the predicted failure ends.

20. The apparatus of claim 15, further comprising reactivating the failure prediction model for processing the stream data at the determined time.

* * * * *